United States Patent
Matsumura

(10) Patent No.: US 9,069,346 B2
(45) Date of Patent: Jun. 30, 2015

(54) MULTI-AXIS MOTOR DRIVING SYSTEM AND MULTI-AXIS MOTOR DRIVING APPARATUS

(71) Applicant: Kabushiki Kaisha Yaskawa Denki, Kitakyushu-shi (JP)

(72) Inventor: Isamu Matsumura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 73 days.

(21) Appl. No.: 14/093,537

(22) Filed: Dec. 2, 2013

(65) Prior Publication Data

US 2014/0084839 A1   Mar. 27, 2014

Related U.S. Application Data

(63) Continuation of application No. PCT/JP2011/062791, filed on Jun. 3, 2011.

(51) Int. Cl.
  *G05B 11/32* (2006.01)
  *H02P 5/46* (2006.01)
  *H02P 23/00* (2006.01)
  *G05D 3/20* (2006.01)

(52) U.S. Cl.
  CPC ...... *G05B 11/32* (2013.01); *H02P 5/46* (2013.01); *H02P 23/005* (2013.01); *G05D 3/20* (2013.01)

(58) Field of Classification Search
  CPC ................................. H02P 5/747; G05G 9/047
  See application file for complete search history.

(56) References Cited

U.S. PATENT DOCUMENTS

| 5,659,480 | A | 8/1997 | Anderson et al. |
| 5,825,150 | A | 10/1998 | Kachi et al. |
| 5,994,861 | A | 11/1999 | Tutumishita |
| 2005/0094343 | A1* | 5/2005 | Mintz, Jr. ...................... 361/104 |
| 2005/0195168 | A1* | 9/2005 | Rosenberg et al. ........... 345/161 |
| 2009/0033624 | A1* | 2/2009 | Rosenberg et al. ........... 345/161 |
| 2011/0301763 | A1 | 12/2011 | Schoenhuber et al. |

FOREIGN PATENT DOCUMENTS

| DE | 19607688 B4 | 10/2005 |
| DE | 102008044341 A1 | 6/2010 |

(Continued)

OTHER PUBLICATIONS

Office Action for Corresponding German Patent Application No. 112011105306.1 dated Jan. 17, 2014, concise explanation of relevance for DE102008044341A1 and DE19607688B4.

(Continued)

*Primary Examiner* — Karen Masih
(74) *Attorney, Agent, or Firm* — Hubbs, Enatsky & Inoue PLLC

(57) ABSTRACT

The multi-axis motor driving apparatus includes an integrated controller that is configured to discriminate between a drive axis that uses the motor subjected to semi-closed control based on the motor control command and a detection position detected by the encoder and a drive axis that uses the motor subjected to full-closed control based on the motor control command, the detection position detected by encoder and a detection position detected by the linear scale, based on a change amount of the detection position of the encoder or the detection position of the linear scale obtained when the motor subjected to full-closed control is driven.

13 Claims, 4 Drawing Sheets

(56) References Cited

FOREIGN PATENT DOCUMENTS

| | | |
|---|---|---|
| JP | 7-225615 A | 8/1995 |
| JP | 10-268924 A | 10/1998 |
| JP | 2002-209397 A | 7/2002 |
| JP | 2007-060864 A | 3/2007 |

OTHER PUBLICATIONS

International Search Report for PCT/JP2011/062791 dated Aug. 30, 2011.

* cited by examiner

MULTI-AXIS MOTOR DRIVING SYSTEM AND MULTI-AXIS MOTOR DRIVING APPARATUS

INCORPORATION BY REFERENCE

The present disclosure contains subject matter related to that disclosed in International Application No. PCT/JP2011/062791 filed on Jun. 3, 2011, the entire contents of which are hereby incorporated by reference.

BACKGROUND OF THE INVENTION

1. Field of the Invention

The embodiments disclosed herein relate to a multi-axis motor driving system and a multi-axis motor driving apparatus.

2. Description of the Related Art

Japanese Patent Application Laid-open No. 7-225615 describes a full-closed loop position control servo driver, which is configured to detect a signal of a position detector on a load side and perform full-closed loop control. The full-closed loop position control servo driver includes a servo motor provided with at least a rotary encoder, a position control driver for controlling the servo motor, a controller, and a linear scale. A position detection signal from the linear scale and a speed detection signal from the rotary encoder are fed back to the position control driver to perform positioning control. After the positioning control is completed, the position control driver outputs a positioning completion signal to the controller.

A multi-axis motor driving system is sometimes constructed by mixing an axis that is independently and uniaxially driven (axis subjected to semi-closed control) and an axis that is driven by forming a full-closed loop. The following problem may occur in this case, but Japanese Patent Application Laid-open No. 7-225615 fails to describe or suggest any solution to the problem.

In the case where the full-closed loop is formed in the multi-axis motor driving system, one of the multiple axes is set as the axis subjected to semi-closed control and another one axis is set as the axis subjected to full-closed control. In setting-up of such a system, motor wires and encoder wires corresponding to the number of drive axes as well as a wire for a position detector need to be routed, and it is necessary to check whether there is an error in correspondence relation between the semi-closed control axis and the full-closed control axis. It is also necessary to set an additional parameter for the full-closed control different from uniaxial driving. Those checking and setting works take time, thus causing a problem in that work efficiency of the setting-up is reduced.

The embodiments has been made in view of the above-mentioned problem, and it is an object of the embodiments to provide a multi-axis motor driving system and a multi-axis motor driving apparatus that facilitate setting-up.

SUMMARY OF THE INVENTION

In order to solve the above-mentioned problem, according to one aspect of the embodiments, there is applied a multi-axis motor driving system, including: a plurality of motors, each including at least a first detector for detecting a position; a host control device for outputting a motor control command; a multi-axis motor driving apparatus for driving the plurality of motors based on the motor control command; and at least one second detector for detecting a position of a load of at least one of the plurality of motors, and the multi-axis motor driving apparatus includes a controller for discriminating between a first drive axis subjected to semi-closed control based on the motor control command and a first detection position detected by the first detector and a second drive axis subjected to full-closed control based on the motor control command, the first detection position, and a second detection position detected by the second detector, based on a change amount of the first detection position or a change amount of the second detection position obtained when the motor for the second drive axis is driven.

DESCRIPTION OF THE EMBODIMENTS

One embodiment is now described with reference to the accompanying drawings.

Figure 1:
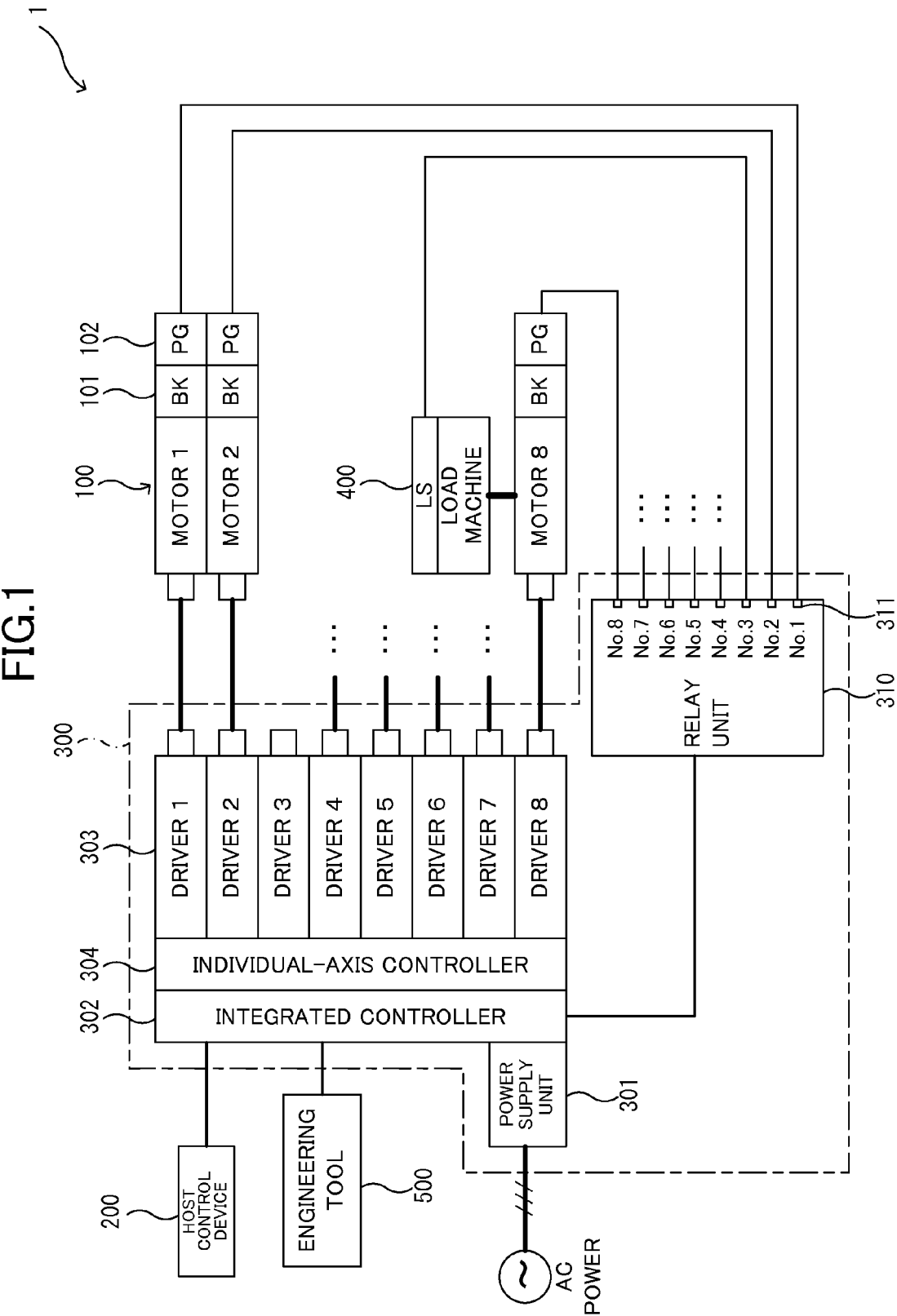
FIG. 1 is a system configuration diagram conceptually illustrating a configuration of a multi-axis motor driving system according to an embodiment.

As illustrated in FIG. 1, a multi-axis motor driving system 1 according to this embodiment includes a plurality of (seven in this example; only three are illustrated and the remaining are omitted) rotary motors 100, a host control device 200 for outputting a motor control command, and a multi-axis motor driving apparatus 300 for driving each motor 100 based on the motor control command of the host control device 200. Each motor 100 includes a brake 101, and an encoder 102 (first detector) for detecting the speed (angular speed) and position (angle) of a rotary axis and outputting the detection signal to the multi-axis motor driving apparatus 300 as a feedback pulse. Note that, the motor 100 does not have to include the brake 101. The position detected by the encoder 102 corresponds to an example of a first detection position as defined in the above-mentioned aspect.

The multi-axis motor driving apparatus 300 includes a power supply unit 301 for inputting AC power, an integrated controller 302 for controlling communications to/from the host control device 200 and controlling the overall multi-axis motor driving apparatus 300, a plurality of (eight in this example) drivers 303 provided correspondingly to the respective motors 100, for supplying electric power to the motor 100 for driving, and an individual-axis controller 304 for controlling the plurality of drivers 303. Note that, the integrated controller 302 corresponds to an example of a controller as defined in the above-mentioned aspect.

The eight drivers 303 are hereinafter referred to as "first to eighth drivers 303" as appropriate, and the respective motors corresponding to the first to eighth drivers 303 are hereinafter referred to as "first to eighth motors 100". In the example illustrated in FIG. 1, seven of the first to eighth motors 100 (excluding the third motor 100) are provided correspondingly to the seven drivers 303 except for the third driver 303. Note that, the fourth to seventh motors 100 are not illustrated in FIG. 1.

The multi-axis motor driving system 1 further includes a linear scale 400 (second detector) for detecting a position of a load of the motor 100. In the example illustrated in FIG. 1, one linear scale 400 is provided for detecting a load machine for the eighth motor 100 (such as a stage moved by a ball screw). The linear scale 400 outputs a position detection signal to the multi-axis motor driving apparatus 300 as a feedback signal (such as a pulse signal or an analog signal). Note that, the position detected by the linear scale 400 corresponds to an example of a second detection position as defined in the above-mentioned aspect.

The multi-axis motor driving apparatus 300 includes a relay unit 310 for relaying the positions detected by the encoders 102 and the linear scale 400 to the integrated controller 302. The relay unit 310 is constructed of a board, a module, or the like, and is provided integrally with the multi-axis motor driving apparatus 300. Note that, the relay unit 310 may be constructed as a separate unit from the multi-axis motor driving apparatus 300. The relay unit 310 includes a plurality of (eight in this example) connectors 311 to be connected to wires from the encoders 102 and a wire from the linear scale 400. The respective connectors 311 correspond to the first to eighth drivers 303. The respective connectors 311 corresponding to the first to eighth drivers 303 are hereinafter referred to as "first to eighth connectors 311". Note that, the multi-axis motor driving apparatus 300 does not have to include the relay unit 310, and the wires from the encoders 102 and the wire from the linear scale 400 may be connected directly to the integrated controller 302.

In the example illustrated in FIG. 1, the wires from the encoders 102 of the first and second motors 100 are connected to the first and second connectors 311, respectively, and the wires from the encoders 102 of the fourth to eighth motors 100 are connected to the fourth to eighth connectors 311, respectively. The wire from the linear scale 400, on the other hand, is connected to the third connector 311 corresponding to the third driver 303 that is not provided with the corresponding motor 100.

The relay unit 310 is configured to arbitrarily set a position of a connector for the wire from the linear scale 400. For example, the wire from the linear scale 400 is connected to the third connector 311 in the example illustrated in FIG. 1, but in the case of changing the position of the connector connected to the wire to the seventh connector 311 for example, seven of the first to eighth motors 100 (excluding the seventh motor 100) are connected to seven of the drivers 303, excluding the seventh driver 303, and the respective wires from the encoders 102 of those motors 100 are connected to the first to eighth connectors 311 (excluding the seventh connector 311). In other words, the wire from the linear scale 400 can be connected to an arbitrary connector 311 as long as the correspondence is established so that the wires from the respective encoders 102 are connected to specific connectors 311 each corresponding to the drivers 303 connected to the motors 100 of the encoders 102.

The detection signals of the respective encoders 102 and the detection signal of the linear scale 400 are input to the integrated controller 302 via the relay unit 310. Based on the detection signals input from the relay unit 310, the integrated controller 302 subjects the eighth motor 100 the position of whose load is detected by the linear scale 400 to full-closed control that uses position feedback output from the linear scale 400, and subjects the other motors 100 to semi-closed control that uses position feedback output from the encoders 102. In this example, the eighth motor 100 (including the brake 101 and the encoder 102), the drive axis for the load machine that is driven with the use of the eighth motor 100, and the linear scale 400 correspond to an example of a second drive axis as defined in the above-mentioned aspect, and the motors 100 other than the eighth motor 100 and drive axes for load machines that are driven with the use of the motors 100 correspond to an example of a first drive axis as defined in the above-mentioned aspect.

Note that, an engineering tool 500 is connected to the multi-axis motor driving apparatus 300. The engineering tool 500 is constructed of, for example, a portable handy controller or the like, and enables an operator to input various kinds of command, data and the like.

Next, the contents of control executed by the integrated controller 302 in setting-up the multi-axis motor driving system 1 are described with reference to FIG. 2. The integrated controller 302 starts the flow illustrated in FIG. 2, for example, when the multi-axis motor driving apparatus 300 is powered on. Note that, it is assumed that before the power is turned on, the motor wire for each motor 100 (wire between each driver 303 and each motor 100), the wire for the brake 101, the wire for the encoder 102 (wire between the encoder 102 and the relay unit 310), and the wire for the linear scale 400 (wire between the linear scale 400 and the relay unit 310) are properly routed by the operator. It is also assumed that the engineering tool 500 is connected in advance to the multi-axis motor driving apparatus 300 and is powered on.

First, in Step S10, the integrated controller 302 initializes a variable i for counting the number of axes (number of motors) subjected to full-closed control to 0, and sets i0 representing a total number of axes (total number of motors) subjected to full-closed control to a predetermined value. In the example illustrated in FIG. 1, the motor subjected to full-closed control is only the eighth motor 100 and hence i0=1. Note that, the value of i0 is manually input by the operator via the engineering tool 500.

In next Step S20, the integrated controller 302 selects, in accordance with a selection signal from the engineering tool 500, a motor 100 subjected to full-closed control from among the plurality of motors 100 connected to the multi-axis motor driving apparatus 300. In the example illustrated in FIG. 1, the motor subjected to full-closed control is the eighth motor 100. The selection signal is manually input by the operator via the engineering tool 500. Note that, if necessary, a rotation direction of the selected motor 100 with respect to the motor control command (for example, a position command direction) of the host control device 200 may be set as well.

In next Step S30, the integrated controller 302 releases the brake 101 of each motor 100, and energizes the motor 100 selected in Step S20 via the individual-axis controller 304 and the driver 303 so that the motor 100 may enter a servo-ON state. Further, based on the detection signals output from the relay unit 310 at this time, the detection positions of all the encoders 102 connected to the connectors 311 of the relay unit 310 and the detection position of the linear scale 400 are stored in a predetermined storage unit (such as a memory) as initial positions. In the example illustrated in FIG. 1, the motor subjected to full-closed control is the eighth motor 100, and hence the integrated controller 302 energizes the eighth motor 100 so that the eighth motor 100 may enter the servo-ON state. Note that, the servo-ON state as used herein represents a positioning control state in which the drive amount is zero, and, in other words, the motor 100 selected in Step S20 is locked to its position of when the energization started.

In next Step S40, the integrated controller 302 outputs a position command indicating a predetermined drive amount to the individual-axis controller 304, and drives the motor 100 selected in Step S20 by a predetermined amount (for example, about ¼ turns to 1 turn) via the driver 303.

In next Step S50, the integrated controller 302 sets parameters for full-closed control. Specifically, first, based on the detection signals from the relay unit 310 that are output when the motor 100 subjected to full-closed control is driven by the predetermined amount in Step S40, the integrated controller 302 identifies the position of a connector of the relay unit 310 for which the detection position has changed by the predetermined amount, and determines that the identified connector 311 is the connector to which the wire from the linear scale 400 is connected. In other words, in the example illustrated in FIG. 1, the integrated controller 302 determines that the third connector 311 is the connector to which the wire from the linear scale 400 is connected.

Next, the integrated controller 302 sets the correspondence between a rotation direction of the motor 100 (in the example illustrated in FIG. 1, the eighth motor 100) and a movement direction of the load machine based on the position detected by the linear scale 400 when the motor 100 subjected to full-closed control is driven by the predetermined amount in Step S40 and the position detected by the corresponding encoder 102 (in the example illustrated in FIG. 1, the encoder 102 of the eighth motor 100).

The integrated controller 302 further calculates a movement amount LSP measured by the linear scale 400 and a movement amount EP measured by the encoder 102 when the motor 100 subjected to full-closed control is driven by the predetermined amount in Step S40 through comparison with the initial positions stored in Step S30, and uses the movement amount LSP and the movement amount EP to set a pulse number $LSP_0$ of the linear scale 400 per unit drive amount (for example, 1 turn) of the motor 100 (in the example illustrated in FIG. 1, the eighth motor 100) based on the following Expression (1).

$$LSP_0 = EP_0 \times (LSP/EP) \quad \text{(Ex. 1)}$$

$EP_0$: number of encoder pulses per motor unit drive amount (pulse/unit drive amount)
LSP: linear scale movement amount (pulse)
EP: encoder movement amount (pulse)

Note that, $EP_0$ is stored in a predetermined storage unit (such as a memory) in advance, or is manually input via the engineering tool 500.

In next Step S60, the integrated controller 302 increments the variable i by 1. In next Step S70, the integrated controller 302 determines whether or not the variable i matches the total number of axes i0. When the variable i and the total number of axes i0 do not match each other (NO in Step S70), the flow returns to Step S20. In other words, when a plurality of motors are subjected to full-closed control, Step S20 to Step S70 are repeated a number of times corresponding to the number of the motors. When the variable and the total number of axes i0 match each other (YES in Step S70), on the other hand, this flow is finished. In the example illustrated in FIG. 1, the total number of axes i0 is 1, and hence the variable i and the total number of axes i0 match each other and this flow is finished.

Note that, the integrated controller 302 executes the procedure illustrated in the flowchart to discriminate between a drive axis (first drive axis) that uses the motor 100 subjected to semi-closed control and a drive axis (second drive axis) that uses the motor 100 subjected to full-closed control. As used herein, the "discrimination between the first drive axis and the second drive axis" includes discriminating the matching between a connection of each axis output of the multi-axis motor driving apparatus 300 (output of each driver 303) to each motor 100 and a connection of an encoder output of each motor 100 to each connector 311 of the relay unit 310.

Specifically, the integrated controller 302 first selects the motor 100 subjected to full-closed control in accordance with the selection signal output from the engineering tool 500 (Step S20), thereby recognizing the connection to the motor 100 subjected to full-closed control and the connection of the corresponding encoder output to the relay unit connector 311. Then, the integrated controller 302 drives the motor 100 by a predetermined amount (Step S40), and determines which connector 311 of the relay unit 310 the position detection signal of the linear scale 400 for detecting the position of the load of the motor 100 is input to (Step S50). On this occasion, the integrated controller 302 monitors a change amount of the position detection signal (first detection position or second detection position) input to the relay unit connector 311, and specifies the connector 311 to which the wire from the linear scale 400 is connected by regarding the position detection signal input to the relay unit connector 311 from which the change amount corresponding to the predetermined drive amount of the motor 100 is obtained as the position detection signal (second detection position) of the linear scale 400 (Step S50). If the plurality of motors 100 are subjected to full-closed control, the above-mentioned flow is repeated to specify other connectors 311 to which wires from other linear scales 400 are connected. In this manner, the integrated controller 302 completes the determination of the drive axis (second drive axis) that uses the motor 100 subjected to full-closed control. The integrated controller 302 also determines the drive axes other than the drive axis (second drive axis) that uses the motor 100 subjected to full-closed control to be the drive axes (first drive axes) that use the motors 100 subjected to semi-closed control.

Accordingly, in the example illustrated in FIG. 1, the drive axis that uses the eighth motor 100, the eighth connector 311 and the third connector 311 of the relay unit 310 is determined to be the drive axis subjected to full-closed control, and the drive axis that uses the first to seventh motors 100 (excluding the third motor 100) and the first to seventh connectors 311 (excluding the third connector 311) of the relay unit 310 are determined to be the drive axes subjected to semi-closed control.

In the multi-axis motor driving system 1 described above, as explained above, the integrated controller 302 of the multi-axis motor driving apparatus 300 automatically discriminates between the drive axis that uses the motor 100 subjected to semi-closed control and the drive axis that uses the motor 100 subjected to full-closed control based on the change amount of the position detected by the encoder 102 or the position detected by the linear scale 400 when the motor 100 subjected to full-closed control is driven. In this manner, there is no need to set, in the setting-up, information on which motor 100 the drive axis uses for full-closed control and which motor 100 the drive axis uses for semi-closed control. Consequently, the setting-up can be facilitated.

Particularly in this embodiment, the multi-axis motor driving apparatus 300 includes the relay unit 310, and hence the following effect is provided. Specifically, in the setting-up of the multi-axis motor driving system 1, the motor wire for each motor 100 (wire between each driver 303 and each motor 100), the wires for the brake 101 and the encoder 102 (wires between the brake 101 and the encoder 102, and the relay unit 310), and the wire for the linear scale 400 (wire between the linear scale 400 and the relay unit 310) are routed. In this case, if the relay unit 310 is configured so that the wire for the linear scale 400 can be connected only to a specific connector 311, the work of confirming which connector is the specific connector 311 is necessary. In another case where the wire for the linear scale 400 cannot (or hardly) be connected to a specific connector 311 due to apparatus arrangement, surrounding environment, or the like, the work of changing the apparatus arrangement or the like is necessary. In this embodiment, on the other hand, the relay unit 310 is configured to arbitrarily set a position of a connector connected to the wire from the linear scale 400. With this configuration, the work of confirming the specific connector 311 as described above is unnecessary, and further, the position of the connector connected thereto can be changed flexibly depending on the apparatus arrangement or the like and hence the work of changing the apparatus arrangement or the like is also unnecessary. Consequently, the setting-up can be facilitated.

Further, in the setting-up of the multi-axis motor driving system 1, after the above-mentioned wires are routed, it is necessary to check the motor wires and the position of the connector connected to the respective wires in the relay unit 310 to confirm whether or not there is an error in correspondence relation between the semi-closed control axis and the full-closed control axis. Specifically, it is necessary to check and confirm that the driver 303 corresponding to the connector 311 connected to the wire of the linear scale 400 is not connected to the motor 100 and that the respective motors 100 and encoders 102 are connected to the corresponding drivers 303 and connectors 311. Particularly in this embodiment, the wire from the linear scale 400 is connected to an arbitrary connector 311 of the relay unit 310, and it is therefore necessary to specify the position of the connector connected to the wire. According to this embodiment, the integrated controller 302 of the multi-axis motor driving apparatus 300 drives the motor 100 subjected to full-closed control by a predetermined amount, and specifies the position of connector connected to the motor 100 whose detection position has changed by the predetermined amount, to thereby automatically discriminate which one of the connectors 311 of the relay unit 310 the wire from the linear scale 400 is connected to (in other words, which one of the axes is the full-closed control axis). Consequently, the correspondence relation between the semi-closed control axis and the full-closed control axis can easily be checked, and hence the work efficiency can be improved to facilitate the setting-up.

In the case of forming the full-closed loop in which the rotary motor 100 is used to move the load machine as exemplified by the multi-axis motor driving system 1 according to this embodiment, the parameters need to be set in the setting-up in a manner that the rotation direction of the motor 100 and the movement direction of the load machine are associated with each other. The reason is as follows. In the case of full-closed control, a target of position control from the host control device 200 is the load machine, but the running direction of the linear scale 400 mounted to the load machine differs depending on how the linear scale 400 is mounted to the load machine. Accordingly, by setting the parameters, the rotation direction of the motor 100 and the movement direction of the load machine (running direction of the linear scale 400) can be associated with each other, and the host control device 200 can therefore perform position control on the load machine. According to this embodiment, based on the position detected by the linear scale 400 when the motor 100 subjected to full-closed control is driven by the predetermined amount and the position detected by the corresponding encoder 102, the correspondence between the rotation direction of the motor 100 and the movement direction of the load machine can automatically be set. Consequently, the parameter setting work in the setting-up is facilitated, and thus the setting-up can be facilitated.

In the case of forming the full-closed loop as exemplified by the multi-axis motor driving system 1 according to this embodiment, the number of pulses of the linear scale 400 per unit drive amount (for example, 1 turn) of the motor 100 needs to additionally be set as the parameter dedicated for full-closed control in the setting-up. This parameter is used as an internal conversion coefficient in the individual-axis controller 304 required when the drive amount (rotation amount) of the encoder 102 is converted from the movement amount of the linear scale 400. For example, this parameter is used when the speed calculated from the movement amount of the linear scale 400 is converted into the angular speed of the motor 100. In general, the movement amount of the linear scale 400 is used as a position feedback signal for a position control loop in the individual-axis controller 304, and the drive amount (rotation amount) of the encoder 102 is used as a speed feedback signal for a speed control loop in the individual-axis controller 304. In this case, the internal conversion coefficient is used for calculating a speed command that is output from the position control loop and input to the speed control loop in the individual-axis controller 304. According to this embodiment, by using the movement amount of the linear scale 400 and the movement amount of the encoder 102 when the motor 100 subjected to full-closed control is driven by the predetermined amount, the pulse number of the linear scale 400 per unit drive amount of the motor 100 can automatically be set. Consequently, the parameter setting work in the setting-up is facilitated, and thus the setting-up can be facilitated.

Note that, the embodiments is not limited to the above-mentioned embodiment, and various modifications are possible within the range not departing from the gist and technical concept thereof. The modified examples are hereinafter described in sequence.

(1) Case where the Multi-Axis Motor Driving System has a Gantry Axis

This modified example is an example where the multi-axis motor driving system has a gantry axis including a master axis and a slave axis that are operated in synchronization.

Figure 3:
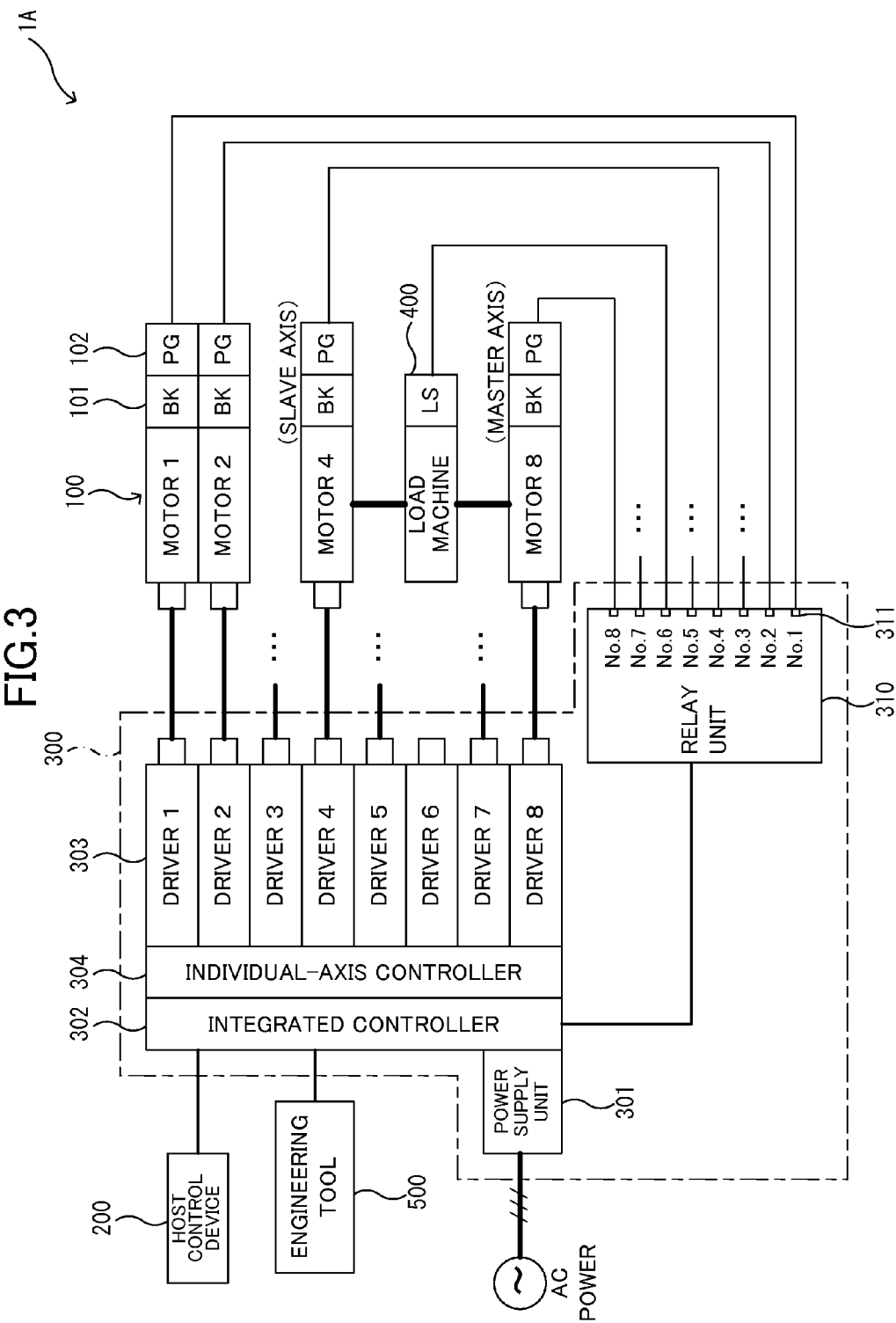
FIG. 3 is a system configuration diagram conceptually illustrating a configuration of a multi-axis motor driving system according to a modified example where the multi-axis motor driving system has a gantry axis.

As illustrated in FIG. 3, in a multi-axis motor driving system 1A according to this modified example, seven of the first to eighth motors 100 (excluding the sixth motor 100) are provided correspondingly to seven drivers 303, excluding the sixth driver 303. Note that, FIG. 3 omits the third, fifth, and seventh motors 100. In this example, the eighth motor 100 is set as a master axis and the fourth motor 100 is set as a slave axis, and one linear scale 400 is provided for detecting a position of a load machine (such as a stage moved by a ball screw) driven by synchronous operation of the eighth and fourth motors 100.

In this modified example, the wires from the encoders 102 of the first to fifth motors 100 are connected to the first to fifth connectors 311, respectively, and the wires from the encoders 102 of the seventh and eighth motors 100 are connected to the seventh and eighth connectors 311, respectively. The wire from the linear scale 400, on the other hand, is connected to the sixth connector 311 corresponding to the sixth driver 303 that is not provided with the corresponding motor 100.

Figure 4:
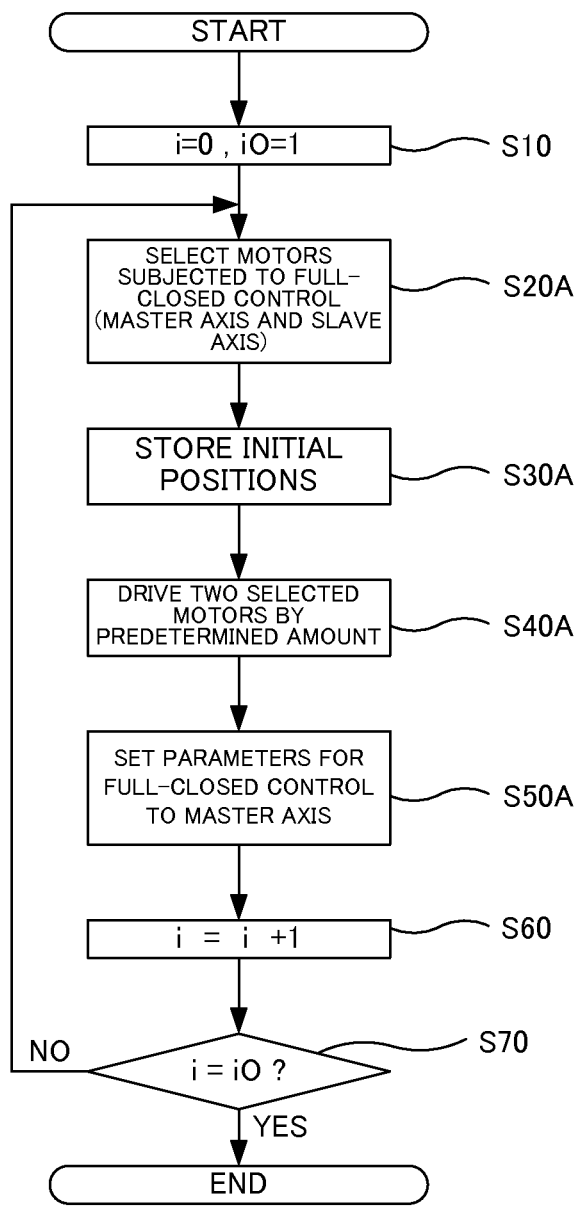
FIG. 4 is a flowchart illustrating the contents of control executed by the integrated controller in the setting-up according to the modified example where the multi-axis motor driving system has the gantry axis.

Next, the contents of control executed by the integrated controller 302 in setting-up of the multi-axis motor driving system 1A are described with reference to FIG. 4. Note that, the parts different from the above description of FIG. 2 are mainly described below, and the description of the similar parts is omitted.

Figure 2:
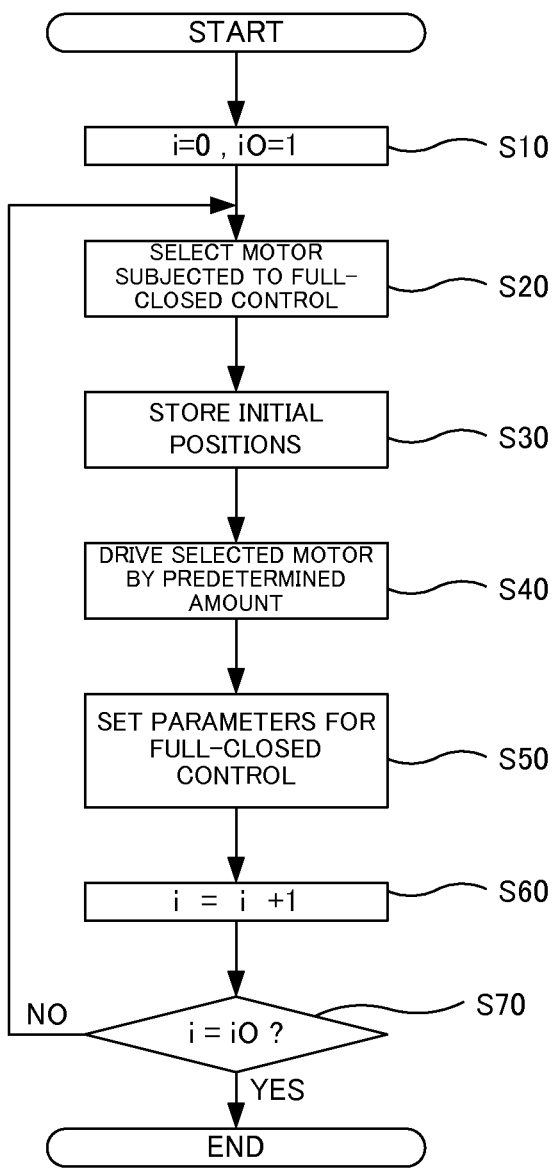
FIG. 2 is a flowchart illustrating the contents of control executed by an integrated controller in setting-up of the multi-axis motor driving system.

Step S10 is the same as in FIG. 2. In next Step S20A, the integrated controller 302 selects a motor 100 subjected to full-closed control from among the plurality of motors 100 connected to the multi-axis motor driving apparatus 300 based on a selection signal from the engineering tool 500. In the example illustrated in FIG. 3, the motors subjected to full-closed control are two motors 100, specifically the eighth motor 100 serving as the master axis and the fourth motor 100 serving as the slave axis. The selection signal therefor is manually input by an operator via the engineering tool 500. Note that, if necessary, the rotation direction of the selected motor 100 may be set as well.

In next Step S30A, the integrated controller 302 releases the brake 101 of each motor 100, and energizes the two motors 100 selected in Step S20A via the individual-axis controller 304 and the drivers 303 to set the selected motors 100 to the servo-ON state. Based on the detection signal from the relay unit 310 at this time, the detection positions of all the encoders 102 connected to the connectors 311 of the relay unit 310 and the detection position of the linear scale 400 are stored in a predetermined storage unit (such as a memory) as initial positions. In the example illustrated in FIG. 3, the two motors 100, specifically the eighth motor 100 and the fourth motor 100, are subjected to full-closed control, and hence the integrated controller 302 energizes those motors 100 so that the motors 100 may enter the servo-ON state.

In next Step S40A, the integrated controller 302 outputs a position command indicating a predetermined drive amount to the individual-axis controller 304, to thereby drive the two motors 100 selected in Step S20A by a predetermined amount (for example, about ¼ turns to 1 turn) via the drivers 303.

In next Step S50A, the integrated controller 302 sets parameters for full-closed control to the eighth motor 100 serving as the master axis. The set contents of the parameters are the same as in FIG. 2. Note that, in regard to the fourth motor 100 serving as the slave axis, by setting the position detected by the encoder 102 of the eighth motor 100 serving as the master axis as a position command, the eighth and fourth motors 100 can be operated in a synchronous manner. The remaining Step S60 and Step S70 are the same as in FIG. 2.

In addition, as in the above-mentioned embodiment, the integrated controller 302 executes the procedure illustrated in the flowchart to discriminate between a drive axis (first drive axis) that uses the motor 100 subjected to semi-closed control and a drive axis (second drive axis) that uses the motor 100 subjected to full-closed control. In the example illustrated in FIG. 3, the drive axes that use the fourth and eighth motors 100 are determined to be the drive axes subjected to full-closed control, and the drive axes that use the first to third, fifth, and seventh motors 100 are determined to be the drive axes subjected to semi-closed control.

Also the modified example described above can provide the same effects as those in the above-mentioned embodiment.

(2) Case where a Motor Subjected to Full-Closed Control is Automatically Selected In the above-mentioned embodiment, the operator uses the engineering tool 500 for manual selection, and the integrated controller 302 selects the motor 100 subjected to full-closed control based on the selection signal. However, the embodiments are not limited thereto, and the integrated controller 302 may detect and automatically select the motor 100 subjected to full-closed control.

In this case, in Step S20 illustrated in FIG. 2, the integrated controller 302 releases the brake 101 of each motor 100, and outputs a position command indicating a predetermined drive amount to the individual-axis controller 304, thereby sequentially driving the plurality of motors 100 by the predetermined amount via the drivers 303. Then, based on the detection signal from the relay unit 310 at this time, the motor 100 for which the position detected by the linear scale 400 has changed by the predetermined amount may be specified, and the drive axis that uses this motor 100 may be selected as the drive axis subjected to full-closed control.

According to this modified example, the motor 100 subjected to full-closed control can automatically be selected, and hence it becomes unnecessary for the operator to manually select the motor, which can further facilitates the setting-up.

(3) Others

Although the case where the multi-axis motor driving system includes the rotary motor 100 has been described above as an example, the motor is not necessarily required to be a rotary motor, and a linear motor may be used for example. Further, although the contents of control illustrated in FIG. 2, etc. are executed by the integrated controller 302, but may be executed by the individual-axis controller 304.

Further, although the multi-axis motor driving system for 8-axis drive has been described above as an example, the number of axes is not limited thereto and may be changed as appropriate. Further, although the case where only one linear scale 400 is provided has been described above as an example, two or more linear scales 400 may be provided.

Further, configurations other than those already described above may be used by appropriately combining the methods described in the above-mentioned embodiment and respective modification examples.

Besides, although not exemplified in detail, the embodiments can be embodied with various changes within the range not departing from the gist thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A multi-axis motor driving system, comprising:
   a plurality of motors, each comprising a first detector for detecting at least a position;
   a host control device for outputting a motor control command;
   at least one second detector for detecting a position of a load of at least one of the plurality of motors; and
   a multi-axis motor driving apparatus including a controller for driving the plurality of motors based on the motor control command and for discriminating, based on a change amount of a first detection position detected by the first detector and a change amount of a second detection position detected by the second detector, between a first drive axis for driving the motor by using the first detection position and a second drive axis for driving the motor by using the second detection position.

2. The multi-axis motor driving system according to claim 1, wherein the controller of the multi-axis motor driving apparatus discriminates between the first drive axis subjected to semi-closed control based on the motor control command and the first detection position and the second drive axis subjected to full-closed control based on the motor control command, the first detection position, and the second detection position, based on the change amount of the first detection position or the change amount of the second detection position obtained when the motor for the second drive axis is driven.

3. The multi-axis motor driving system according to claim 2, wherein the multi-axis motor driving apparatus further comprises a relay unit for relaying the first detection position and the second detection position to the controller, the relay unit comprising a plurality of connectors to be connected to wires each from the first detectors and a wire from the second detector and being configured to arbitrarily set a position of a connector to connect the wire from the second detector to.

4. The multi-axis motor driving system according to claim 1, wherein the controller specifies a position of a connector of the relay unit, the second detection position relayed for which from the relay unit when the motor for the second drive axis is driven by a predetermined amount has changed by a predetermined amount, and determines that the specified connector is a connector to which the wire from the second detector is connected.

5. The multi-axis motor driving system according to claim 1, wherein the controller sets, based on the second detection position relayed from the relay unit when the motor for the second drive axis is driven by a predetermined amount and the first detection position corresponding thereto, a correspondence between a drive direction of the motor for the second drive axis and a movement direction of the load.

6. The multi-axis motor driving system according to claim 1, wherein the controller sets, based on the second detection position relayed from the relay unit when the motor for the second drive axis is driven by a predetermined amount and the first detection position corresponding thereto, a pulse number of the second detector per unit drive amount of the motor.

7. The multi-axis motor driving system according to claim 1, wherein the controller specifies the motor for which the second detection position relayed from the relay unit when the plurality of motors are sequentially and individually driven by a predetermined amount has changed by a predetermined amount, and selects a drive axis that uses the specified motor as the second drive axis.

8. A multi-axis motor driving apparatus, comprising:
a controller for driving a plurality of motors each including a first detector based on a motor control command output from a host control device, and for discriminating, based on a change amount of a first detection position detected by the first detector or a change amount of a second detection position detected by at least one second detector for detecting a position of a load of the motor, between a first drive axis for driving the motor by using the first detection position and a second drive axis for driving the motor by using the second detection position.

9. The multi-axis motor driving apparatus according to claim 8, wherein the controller discriminates between the first drive axis subjected to semi-closed control based on the motor control command and the first detection position and the second drive axis subjected to full-closed control based on the motor control command, the first detection position, and the second detection position detected by the at least one second detector for detecting the position of the load of the motor, based on a change amount of the first detection position or a change amount of the second detection position obtained when the motor for the second drive axis is driven.

10. The multi-axis motor driving apparatus according to claim 8, further comprising a relay unit for relaying the first detection position and the second detection position to the controller, the relay unit comprising a plurality of connectors to be connected to wires each from the first detectors and a wire from the second detector and being configured to arbitrarily set a position of a connector to connect the wire from the second detector.

11. A multi-axis motor driving apparatus, comprising:
control means for driving a plurality of motors each including a first detector based on a motor control command output from a host control device, and for discriminating, based on a change amount of a first detection position detected by the first detector or a change amount of a second detection position detected by at least one second detector for detecting a position of a load of the motor, between a first drive axis for driving the motor by using the first detection position and a second drive axis for driving the motor by using the second detection position.

12. The multi-axis motor driving apparatus according to claim 11, wherein the control means discriminates between the first drive axis subjected to semi-closed control based on the motor control command and the first detection position and the second drive axis subjected to full-closed control based on the motor control command, the first detection position, and the second detection position detected by the at least one second detector for detecting the position of the load of the motor, based on a change amount of the first detection position or a change amount of the second detection position obtained when the motor for the second drive axis is driven.

13. The multi-axis motor driving apparatus according to claim 11, further comprising a relay unit for relaying the first detection position and the second detection position to the control means, the relay unit comprising a plurality of connectors to be connected to wires each from the first detectors and a wire from the second detector and being configured to arbitrarily set a position of a connector to connect the wire from the second detector.

\* \* \* \* \*